United States Patent [19]

Waren

[11] 3,928,206

[45] *Dec. 23, 1975

[54] APPARATUS FOR THE COLLECTION OF BUOYANT FOREIGN MATTER

[76] Inventor: Frank Arthur Oakley Waren, 301 A Kingsway, Hove, Sussex, England

[ * ] Notice: The portion of the term of this patent subsequent to Aug. 8, 1989, has been disclaimed.

[22] Filed: July 18, 1974

[21] Appl. No.: 489,811

Related U.S. Application Data

[63] Continuation-in-part of Ser. No. 217,058, Jan. 11, 1972, abandoned.

[30] Foreign Application Priority Data

Jan. 21, 1971 United Kingdom................ 2898/71

[52] U.S. Cl............................ 210/242; 210/DIG. 21
[51] Int. Cl.²........................................ E02B 15/04
[58] Field of Search ....... 210/160, 83, 242, DIG. 21

[56] References Cited
UNITED STATES PATENTS

| | | | |
|---|---|---|---|
| 2,307,601 | 1/1943 | Nichols | 210/160 |
| 3,623,609 | 11/1971 | Amlay | 210/242 |
| 3,630,376 | 12/1971 | Price | 210/242 |
| 3,637,080 | 1/1972 | Markel | 210/DIG. 21 |
| 3,656,624 | 4/1972 | Walton | 210/242 |
| 3,682,316 | 8/1972 | Waren | 210/242 |
| 3,708,070 | 1/1973 | Bell | 210/242 |

FOREIGN PATENTS OR APPLICATIONS 1,131,513   10/1968   United Kingdom.......... 210/DIG. 21

*Primary Examiner*—Theodore A. Granger
*Attorney, Agent, or Firm*—Burgess Ryan and Wayne

[57] ABSTRACT

Apparatus for collection oil and/or debris floating on or near the surface of a body of water includes a collecting tank supported to float in water with its upper edge above water level, the tank having side walls, a rear wall and an open bottom. Water and any oil or debris present is caused to flow into the tank by means of a vaned impeller extending between the side walls of the tank and arranged for rotation about a horizontal axis positioned somewhat above water level. The oil and debris collected in the tank is retained therein by a non-return valve consisting of a plate which extends between the side walls of the tank rearwardly of the impeller and is pivotally mounted at its lower edge for rearward movement about an axis positioned below water level. The upper edge of the plate is provided with a float so as normally to maintain this edge above water level.

23 Claims, 7 Drawing Figures

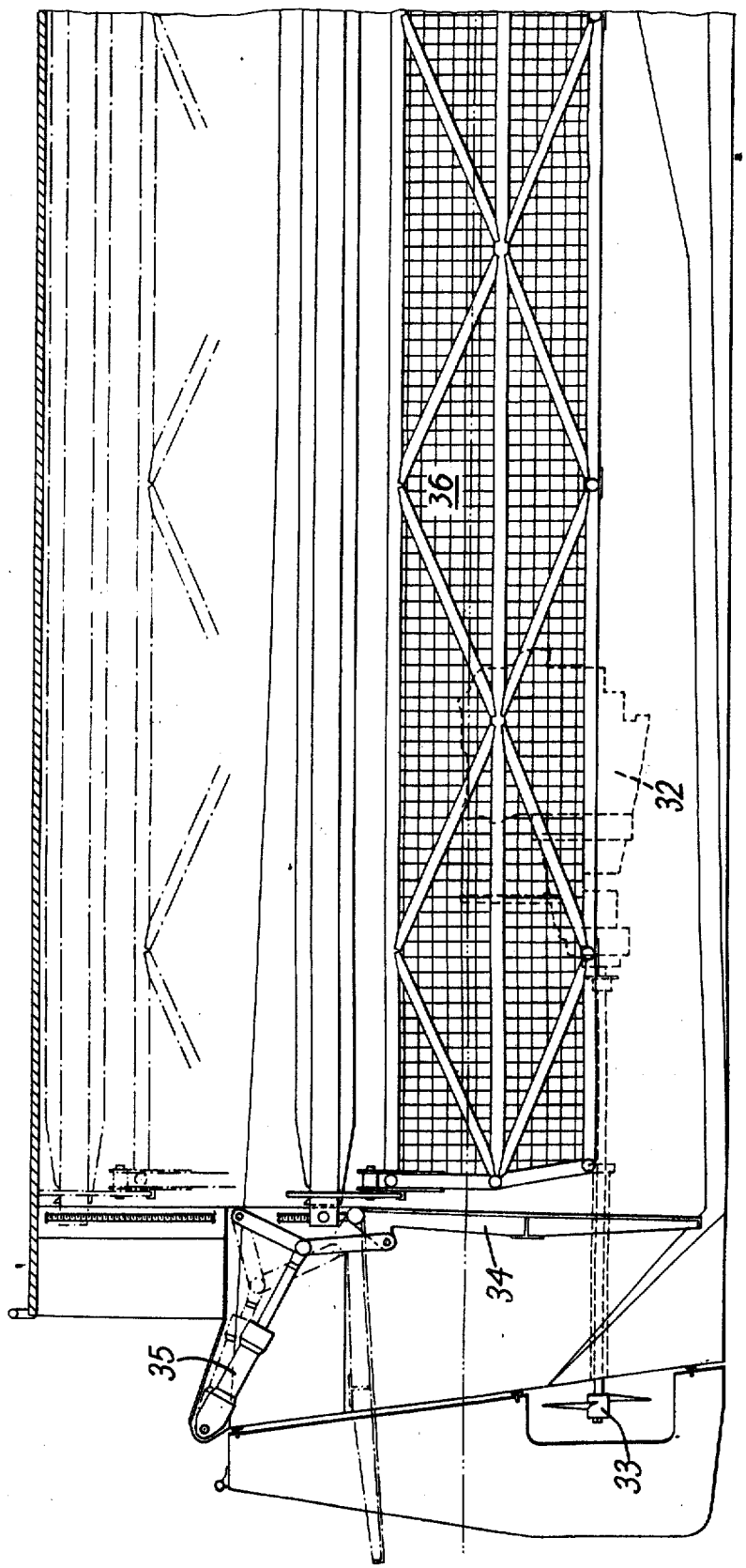

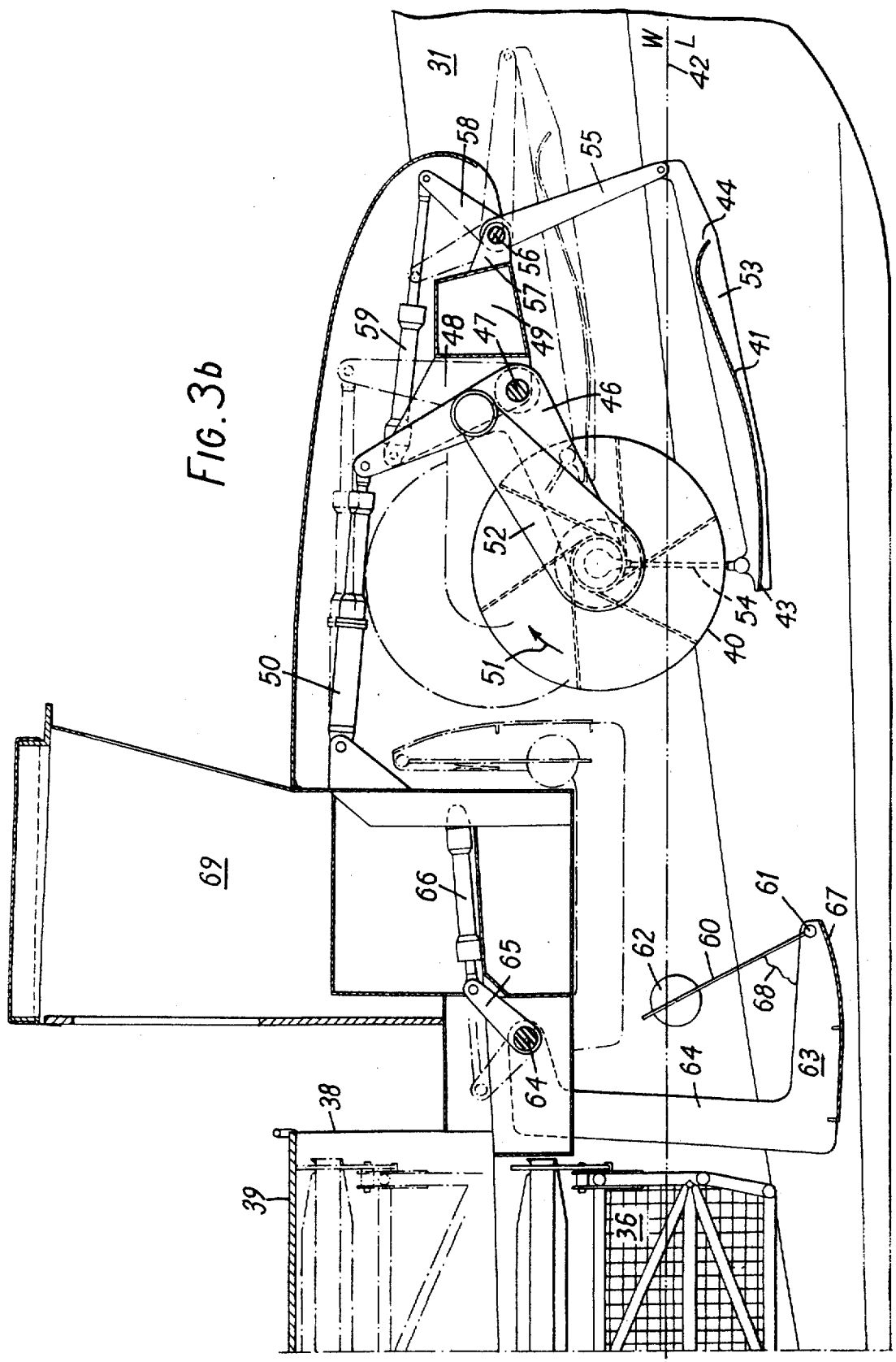

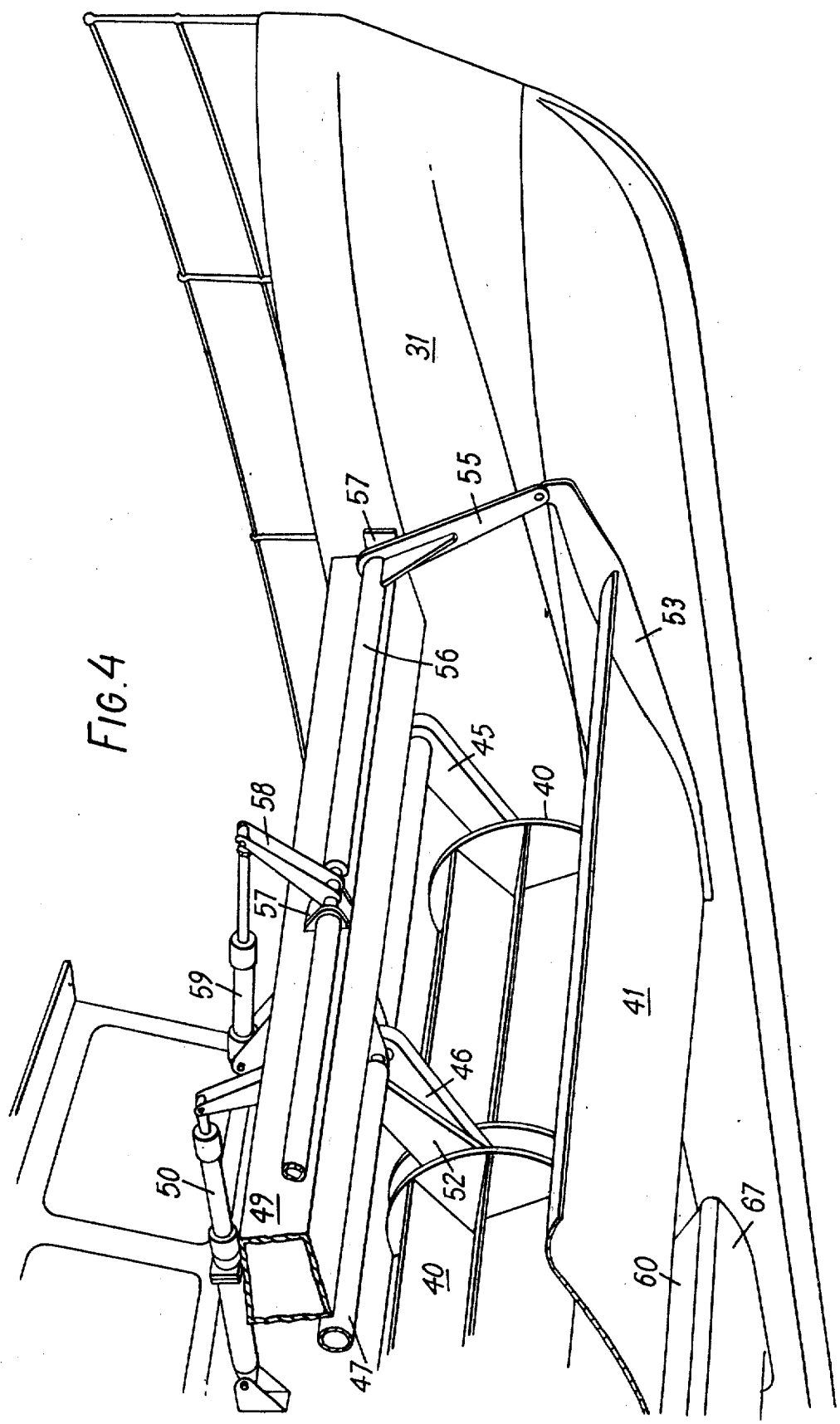

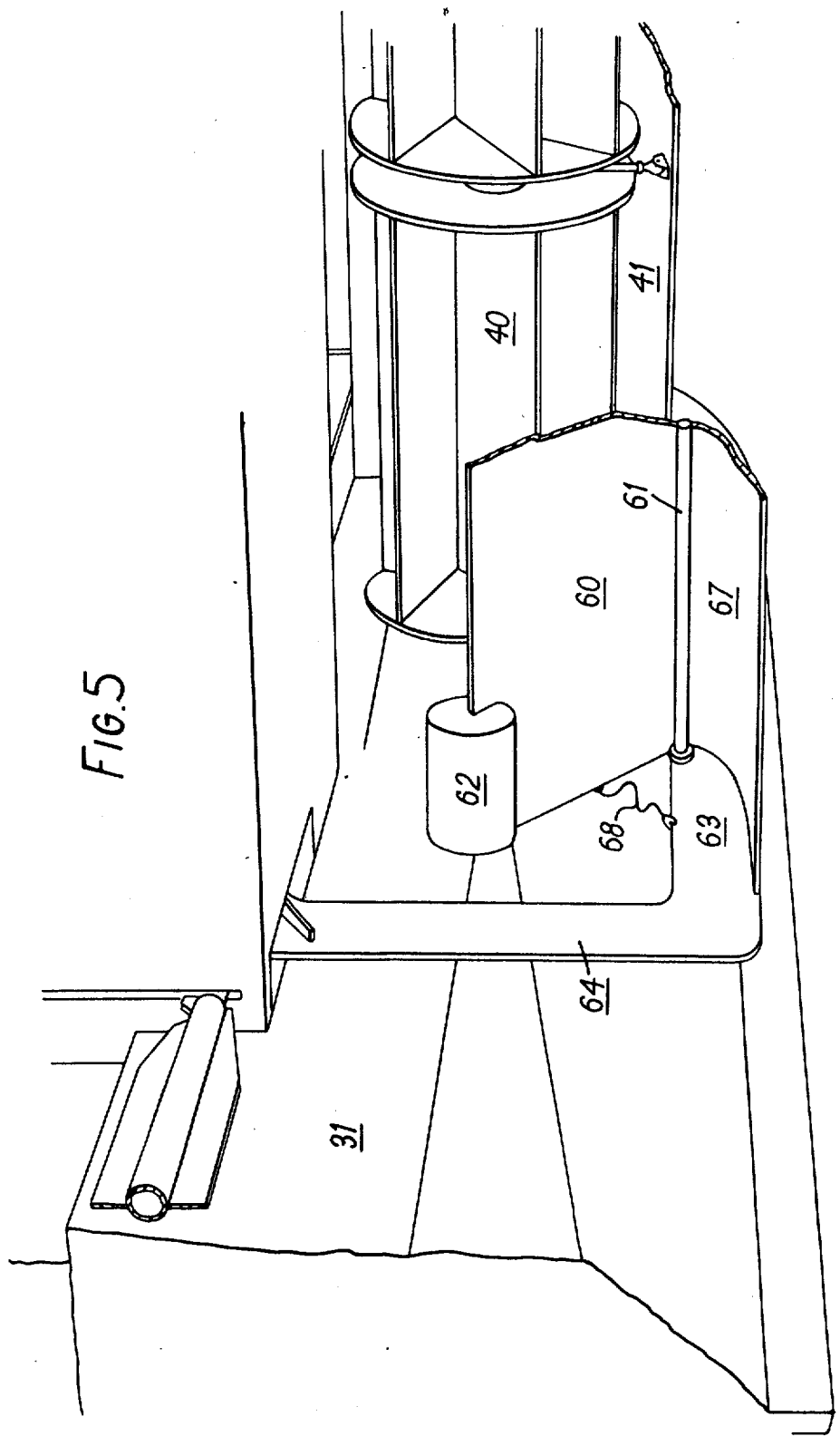

3,928,206

APPARATUS FOR THE COLLECTION OF BUOYANT FOREIGN MATTER

This invention which is a continuation in part of my application Ser. No. 217,058 filed Jan. 11th 1972 now abandoned, relates to apparatus for collecting buoyant foreign matter, i.e., foreign matter floating on or near the surface of a body of water, and is particularly applicable both to the collection of spilt oil and to the collection of floating debris of all kinds.

BACKGROUND OF THE INVENTION

The apparatus to which this invention relates is of the kind which comprises a floating tank, having a generally open bottom, and into which water drawn in at or near surface level is caused to flow. In the operation of such apparatus for collecting oil it is intended that the lighter oil should separate out within the tank from the water and oil entering the tank and that in the course of operation the tank will become filled with oil, the water being displaced through the bottom of the tank.

Examples of such prior art apparatus are disclosed in my U.S. Pat. No. 3,682,316 and in U.S. Pat. Nos. 3,623,609 Ainlay, 3,219,190 Thune, and 2,876,903 Lee.

In general such prior art apparatus is not altogether satisfactory as regards the efficiency and speed of separation of water and oil within the tank. This is believed to be due to the fact that such prior art apparatus seeks to maximise the volume of oil and minimise the volume of water directed into the tank which in turn leads to a construction that produces excessive turbulence in the water and oil entering the tank.

I have now found that greater efficiency and speed of separation is possible if no regard is paid to the volume of water entering the tank and the construction is such as to enable what may be described as a river of oil and water to flow in a straight line into the tank from the general body of water outside with a minimum change in direction both in a vertical and in a horizontal plane.

A further drawback in the apparatus of the prior art is that it can be prevented from operating, or even damaged, if solid debris is drawn in whereas it is an important requirement of such apparatus particularly when used in rivers, harbours or docks that it shall be capable of collecting such debris.

SUMMARY OF THE INVENTION

Apparatus constructed in accordance with the principle of the present invention comprise a collecting tank comprising side walls, a rear wall, and a substantially open bottom, the tank being supported so as to float in a body of water with its upper edge above water level. Water is caused to flow into the collecting tank by means of a vaned impeller which extends between the side walls of the tank and is arranged for rotation about an axis positioned somewhat above water level. Oil or other foreign matter entering the collecting tank is retained therein by means of a non-return valve arranged downstream of the impeller. This valve comprises a plate extending between the side walls of the tank which is pivoted at one edge for rearward movement about an axis positioned below water level which the other edge is supported so that it normally extends somewhat above water level by means of one or more floats. This non-return valve is so arranged that it can easily be depressed by the flow of water produced by the impeller so that there is nothing of the nature of a fixed weir over which the water would fall and thus produce turbulence.

In one form of the apparatus of this invention the impeller is arranged to co-operate with a floor member which extends below water level between the side walls of the tank with a rear edge positioned adjacent and below the periphery of the impeller and a front edge extending forwardly of the impeller. The impeller and co-operating floor member constitute a pump which may be described as one having a maximum volume delivery and a minimum pressure differential. The floor member which co-operates with the impeller is preferably inclined, and possibly slightly curved in a forwards and upwards direction and its forward edge may be curved forwardly and downwardly to form a rounded lip which is positioned a predetermined distance below water level. In operation a river of water (and oil) flows downwardly over the floor member and in order to minimise turbulence the entry velocity of the impeller vanes into the water is kept closely the same as the velocity of the water.

In a preferred form of the apparatus of this invention the side walls of the collecting tank are defined by the facing sides of two spaced hulls which form a catamaran type vessel. Within the collecting tank there may be arranged a cage having a floor, a rear wall, side walls and an open front in which debris entering the tank is collected and by which such debris may be removed by lifting the cage out of the tank.

In this preferred form of the apparatus means may be provided for lifting to above water level the impeller, the co-operating floor member if this is provided, the non-return valve, the cage, and the rear wall of the collecting tank so that there is minimum resistance to movement when the apparatus is not in use for collecting and merely proceeding from point to point. When an impeller having a co-operating floor member is used the lifting gear for these parts may be operable independently so that an operator may move the impeller and floor member out of harms way if large floating debris is encountered. As a precaution the supporting means for the rear edge of the floor member may include a linkage of the type which can break so as to increase the distance between the impeller and floor member if a solid piece of debris became caught therebetween.

BRIEF DESCRIPTION OF THE DRAWINGS

FIGS. 3a and 3b are a central longitudinal section of the apparatus of FIG. 2, FIG. 4 is a fragmentary pictorial view looking rearwardly from the front of the apparatus of FIG. 2, FIG. 5 is a fragmentary pictorial view looking forwardly towards the non-return valve and pump.

DESCRIPTION OF THE PREFERRED EMBODIMENTS

Figure 1:
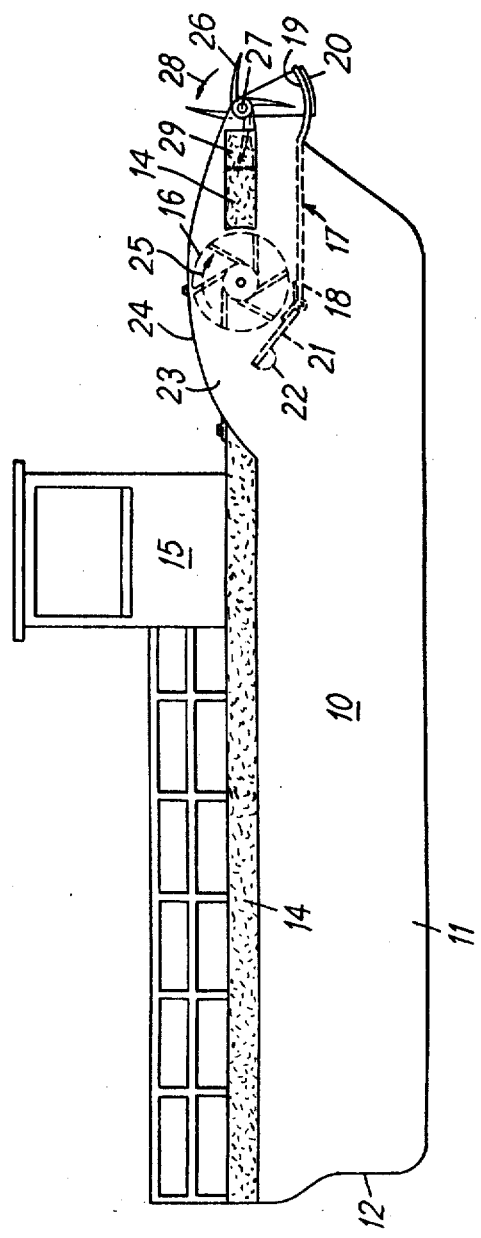
FIG. 1 is a diagrammatic sectional side elevation of one embodiment of the apparatus of this invention.
Figure 2:
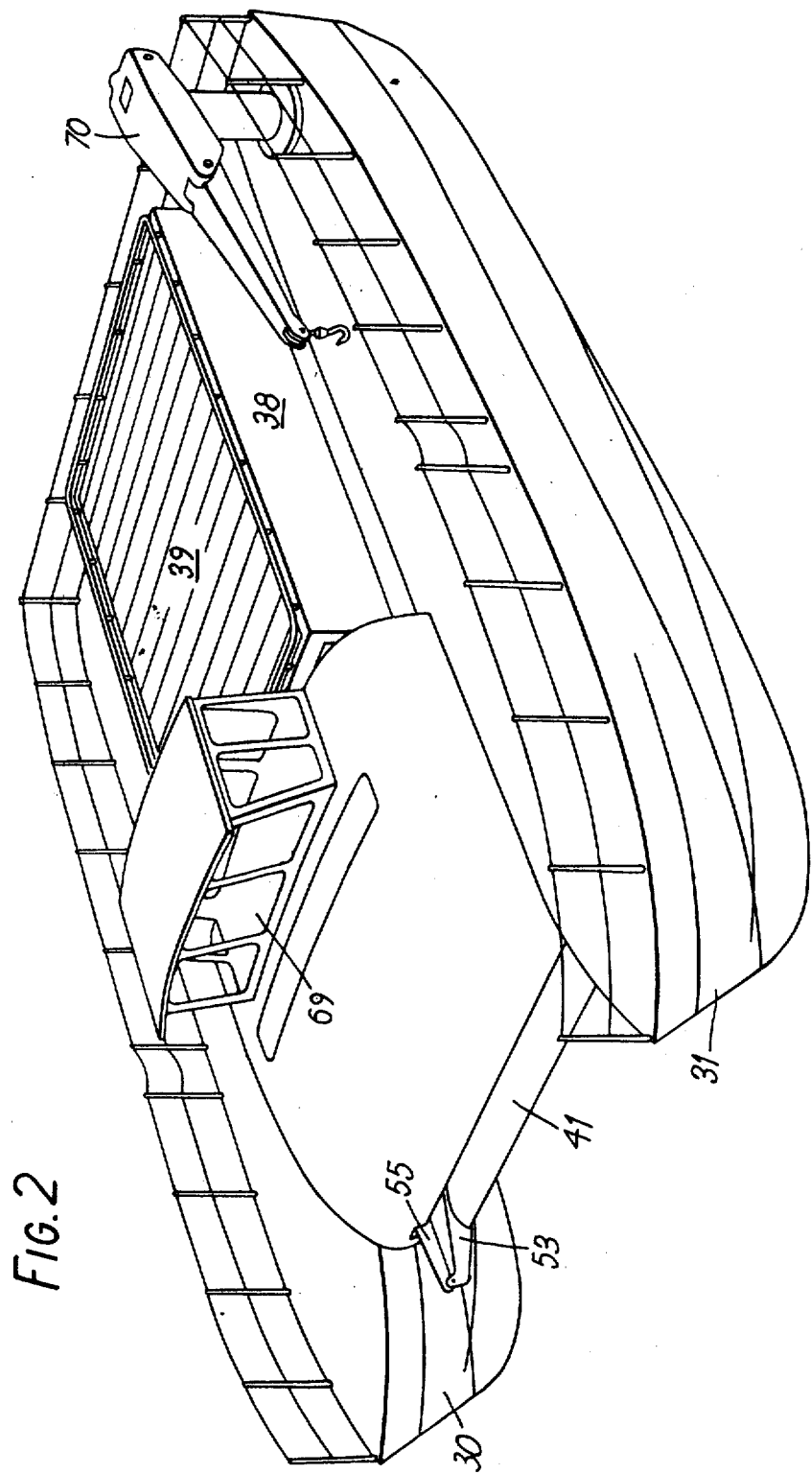
FIG. 2 is a perspective view of another embodiment of the apparatus of this invention.
Figure 6:
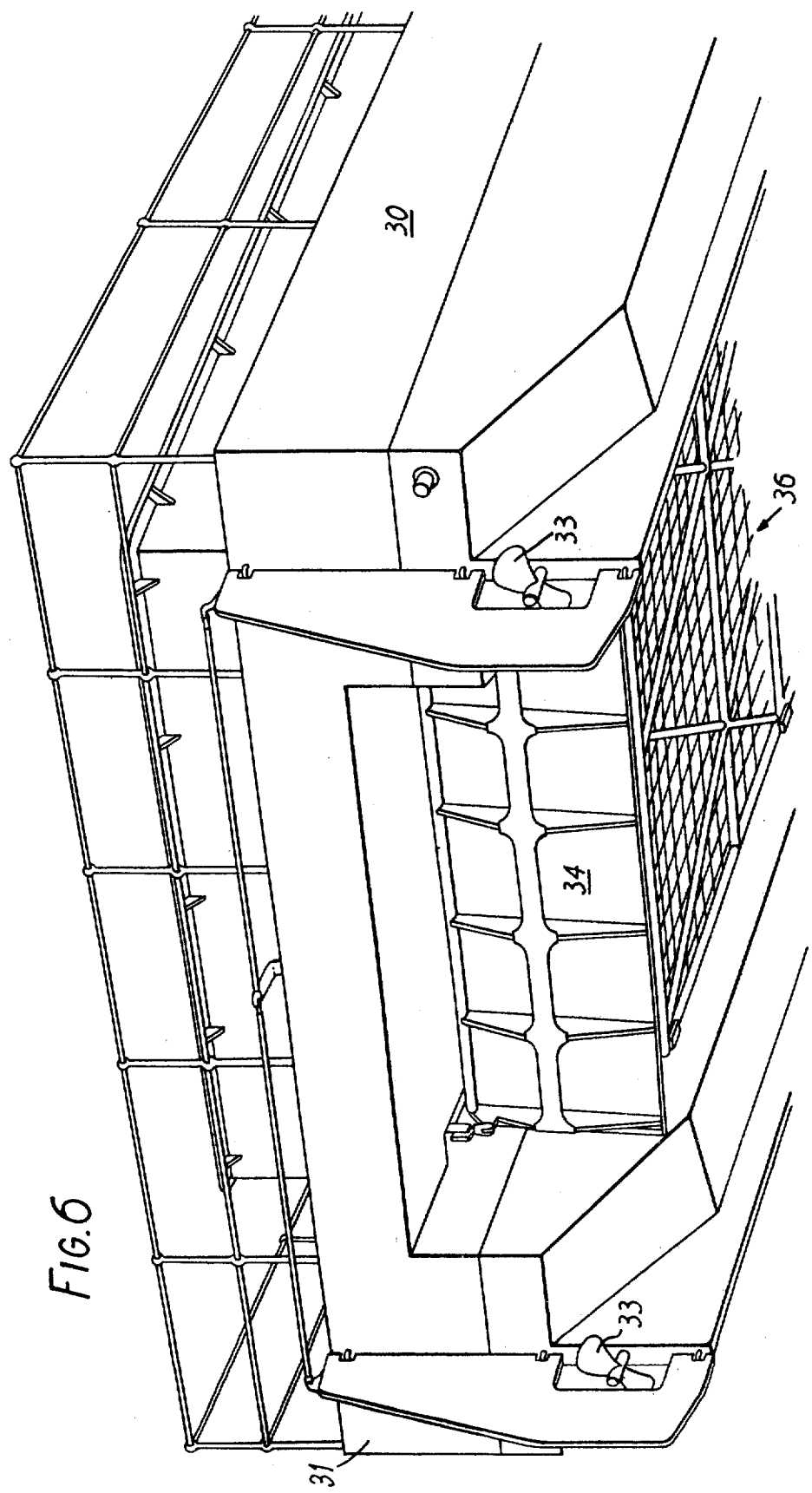
FIG. 6 is a fragmentary pictorial view looking forwardly towards the rear of the apparatus.

Referring to FIG. 1, which shows diagrammatically an apparatus according to this invention for the collection of oil, the apparatus comprises a tank 10 having a pair of opposed side walls 11 (only one of which is visible), and a rear wall 12, which is shaped to improve the navigation performance of the apparatus. The bottom of the tank is open. The walls are made of any suitable material, such as metal, or resin-bonded glassfibre. Part or all of the top of the tank is closed by a deck 14 which is provided with a cabin 15 for the operator. This cabin also houses an engine (not shown) for driving a pump which will be described hereinafter. The buoyancy of the apparatus is arranged to be such that the tank floats with its upper edge above water level.

The pump comprises a vaned impeller 16 and a cooperating floor member 17 both extending between the side walls 11. The floor member which is below water level has a rear edge 18 below and adjacent the periphery of the impeller 16 and a forward edge 19 of part circular section which is provided with a movable lip portion 20 that can be adjusted to a desired position below the water level. If desired this lip portion may be connected by arms to floats which act as described in my U.S. Pat. No. 3,682,316 to maintain substantially constant the depth of the lip below water level.

A plate 21 which extends between the side walls 11 is hinged at its lower edge to the rear edge 18 of the floor member 17 and is provided with a float 22 along its upper edge which ensures that this upper edge is normally maintained above water level. The arrangement acts as a non-return valve to prevent back flow from the tank past the impeller when this is not being rotated, but is so arranged that the plate can turn rearwardly and downwardly when the impeller is rotated to permit a free flow of water into the tank.

The impeller 16 is arranged in a transverse slot 23 in the deck 14 which is covered by a housing 24 that can be opened to provide access to the impeller. Suitable drive means (not shown) connect the impeller with the engine in the cabin 15 so that the impeller may be rotated in the direction of the arrow 25.

In order to prevent floating debris from being drawn into the impeller 16 a plurality of prongs 26 are provided to pick up such debris. These prongs are spaced in groups of four about the periphery of a shaft 27 at a series of locations spaced along the shaft. The shaft 27 is arranged to be rotated in the direction of the arrow 28 (i.e., in the opposition direction to the impeller 16) by the engine driving the impeller, through suitable gearing (not shown). At least the ends of each group of four prongs are arranged to pass through slots 29 in the deck 14 and housing 24 which perform a wiping action on the prongs and ensure that debris picked up by the prongs is deposited on the deck, where it can be allowed to pile up, or removed manually or otherwise.

The engine used to drive the impeller 16 and shaft 27 may be a conventional internal-combustion engine. This engine may also be used to drive a pump (not shown) mounted on the deck and serving to discharge oil collected within the tank.

The tank may be provided with an outboard motor or other means for driving it and means may also be provided for steering the tank. Alternatively, the tank may be arranged to be towed by one or more craft.

In operation, the tank is taken to the area in which an oil slick or patch has been located and is then driven or towed into contact with the edge of the oil slick or patch. The engine for driving the impeller 16 and the shaft 27 is then started and a large volume of water and oil mixture is thus drawn over the lip portion 20 and into the tank 10. Since the oil being lighter floats on the surface of the water in the tank the water is displaced by the oil and consequently leaves the tank through the open bottom thereof. Thus the oil is collected in the tank and, when the tank is full, it may be taken back to harbour for the oil to be pumped out. Alternatively, the oil may be pumped out of the tank while the apparatus is in operation so that the oil may be collected in drums or other suitable containers, or in another vessel, and be taken away without stopping the collection of oil.

Referring now to the embodiment of the apparatus of this invention illustrated in FIGS. 2 to 6 the apparatus comprises a catamaran type vessel having two hulls 30 and 31 joined and held spaced apart by suitably positioned cross beams. For propulsion each hull may include an engine 32 (FIG. 3a) driving a screw 33, and these engines, or at least one of them, may also be used to supply hydraulic pressure fluid for operating devices to be described below.

At the stern of the vessel the space between the hulls is closed by a bulkhead 34 which is pivotable about its upper edge between a vertical closed position and an horizontal open position shown in broken lines in FIG. 3a by means of hydraulic actuator 35.

The bulkhead 34 forms the rear wall of a collecting tank having side walls formed by the facing sides of the hulls 30 and 31 and an open bottom. Within this tank is arranged a cage 36 for the collection of debris. This cage which is open at its forward end and has side walls a rear wall and a floor is constituted by a metal framework on which is secured a wire mesh. The cage may be lifted from the position shown in full lines in FIG. 3 to the position shown in broken lines, for example, by means of screw jacks, one of which is shown at 37 (FIG. 3a). In its raised position the cage is located in a housing 38 projecting above the deck of the vessel and covered by a hatch 39. On removal of this hatch the cage may be lifted out of the vessel for the disposal of debris collected therein.

In the forward part of the vessel there is arranged a means for directing water with any oil or debris thereon into the collecting tank. This means comprises a rotatable vaned impeller 40. In some circumstances this impeller may co-operate with a floor member 41, to form a pump which is characterised by a high volume delivery and a very low differential pressure. Both the impeller and the floor member extend between the facing sides of the hulls 30 and 31. The floor member is positioned below the water level shown by broken line 42 with its rear edge 43 positioned below the centre line of the impeller. As shown the floor member is inclined forwardly and upwardly from the rear edge 43 with its forward edge 44 curved forwardly and downwardly to form a lip positioned a predetermined distance below water level.

The impeller 40 and floor member 41 are so mounted that they can both be raised to the position shown in broken lines which is above water level. For this purpose the shaft carrying the impeller is journalled at its ends in the ends of arms 45 (FIG. 4), and at its centre in one end of a bell crank lever 46. The arms 45 and the lever 46 are fast with a cross shaft 47 which is carried in bearing brackets 48 mounted on a forward box section cross beam 49 connecting the two hulls 30 and 31. The upper end of bell crank lever 46 is connected with an hydraulic actuator 50. Rotation of the impeller 40 in the direction of the arrow 57 is conveniently effected by an hydraulic motor (not shown) which is mounted on bell crank lever 46 and connected with the impeller by a chain drive located in housing 52.

The floor member 41 is secured at its side edges to plate members 53 which at the rear edge 43 of the floor member are supported by links 54 extending from the impeller shaft, and at the forward end are connected to arms 55 fast with a cross shaft 56. This shaft, which is carried in bearing brackets 57 mounted on the forward face of cross beam 49, has a central arm 58 fast therewith and which is connected with an hydraulic actuator 59.

Intermediate the pump and the forward end of the collecting tank is a non-return valve which in effect constitute the forward end of this tank. This valve comprises a plate 60 which extend between the facing sides of the hulls 30 and 31. This plate is pivotally mounted at its lower edge on a cross shaft 61 which is positioned below water level, and at its upper edge is provided with floats 62 so that this upper edge normally extends above water level. The shaft 61 is mounted at its ends in the forwardly extending ends of the arms 63 of L shaped members 64 which extend adjacent the respective hulls 30 and 31. At their upper ends these members are fast with a cross shaft 64$^1$ which is carried in suitable bearings (not shown) and has fast therewith an arm 65 connected to an hydraulic actuator 66. The arms 63 of the two members 64 are joined together by a plate 67 secured on their lower edges and which extends forwardly and upwardly to the pivot shaft 61 as shown. The non-return valve plate 60 is prevented from moving to a vertical position and forwardly of this position by a flexible member 68 which extends between the plate 60 and an arm 63. The plate is however free to move rearwardly from the position shown in order to allow water and floating debris to enter the collecting tank. The actuator 66 is provided to enable the members 64 and the non-return valve carried thereon to be swung forwardly and upwardly to a position shown in broken lines where the non-return valve is above water level and housed in a space between a cabin 69 and the pump impeller 40.

In the operation of this embodiment of the invention and when the vessel is proceeding from point to point and is not required to collect oil an operator in the cabin 69 actuates controls (not shown) to cause the bulkhead 34, the cage 36, the non-return valve 60, and the pump comprising impeller 40 and floor member 41 all to be lifted to the position shown in broken lines in FIG. 3 when they are above water level so that there is a minimum of resistance to movement of the vessel. When in use to collect oil all these parts are lowered to the position shown in full lines in FIG. 3 and the impeller 40 is then set in rotation in the direction of the arrow 51. During operation of the impeller the water level in the vicinity of the impeller will fall somewhat below the general level indicated by broken line 42 and water will tend to flow over the forward lip of the floor member 41 downwards towards the impeller. To minimise turbulence it is important so to control the speed of rotation of the impeller that the entry velocity of the impeller vanes is of the same order as that of the water.

The large volume flow of water produced by the pump between the facing sides of the hulls will depress the non-return valve rearwardly to allow water with any oil or debris therein to flow into the collecting tank wherein oil separates out from the water, displacing water through the open bottom of the tank, and debris is collected in the cage. Small floating debris may pass through the gap between the impeller 40 and the floor member 41 but if larger debris is encountered the oporerator may operate the actuators 50 and 59 so as to lift the pump above water level when the debris passing underneath the pump may depress the non-return valve and move directly into the cage. If very large debris is encountered the vessel may be suitably manoeuvred and the crane 70 (FIG. 2) used to hoist such debris onto the deck. In order to prevent damage to the impeller if debris which is too large to pass through the gap between the impeller and floor member enters the pump unseen by the operator the links 54 which support the rear end of the floor member may be constructed in such a manner that the distance between the floor member and impeller may be increased in such circumstances. These links may for example be telescopic or constituted by two parts which are normally arranged at an angle to one another but which can straighten out to increase the effective length of the link.

In the case where the floor member 41 is omitted it is not necessary to lift the impeller 40 if large debris is encountered since such debris will pass below the periphery of the impeller and will be urged thereby into the collecting tank, the non-return valve plate 60 being depressed rearwardly by the debris as it moves into the collecting tank. It will however still be necessary to raise the impeller when the vessel is travelling from point to point and is not in use for collecting oil or debris.

I claim:

1. Apparatus for collecting buoyant foreign matter floating on or near the surface of a body of water comprising a collecting tank having side walls, a rear wall and a substantially open front and bottom, means for supporting the tank to float in water with its upper edge above water level, a vaned impeller extending between the side walls of the tank adjacent the front thereof, said impeller being mounted for rotation about an horizontal axis positoned such that the lower vanes extend below water level, and a non-return valve positioned downstream of said impeller, said valve comprising a plate extending between the said side walls, said plate having a lower edge pivotally mounted on a horizontal axis positioned below water level and an upper edge supported to extend somewhat above water level by at least one float.

2. Apparatus as claimed in claim 1 including a floor member extending between said side walls below water level, said floor member having a rear edge positioned below and spaced from said impeller and a front edge extending forwardly of said impeller.

3. Apparatus as claimed in claim 2 in which said floor member and said side walls define a passage leading into said tank, said passage having an inlet, a housing extending over the passage and said impeller, and means for preventing entry into the passage of floating material not required to be collected, said means including a plurality of prongs mounted at spaced locations along a shaft, a plurality of prongs being equispaced along the shaft at each location, said shaft being mounted above the inlet to said passage so that the prongs can extend into said passage, and being rotatable in a direction such that material picked up by said prongs is deposited on top of said housing.

4. Apparatus as claimed in claim 3 in which said prongs are arranged to pass through slots in said housing during rotation of the shaft, said slots thereby exerting a wiping action on said prongs.

5. Apparatus as claimed in claim 2 in which the front edge of said floor member has a separate movable lip portion to be positioned aa predetermined depth below water level.

6. Apparatus as claimed in claim 1 including a cage removably supported in said collecting tank, said cage having side walls, a rear wall, a floor and an open front.

7. Apparatus as claimed in claim 6 including means for lifting said cage to a position in which the floor is above water level.

8. Apparatus as claimed in claim 1 in which said impeller is movably mounted and including means for lifting said impeller above water level.

9. Apparatus as claimed in claim 1 in which said rear wall of the collecting tank is movably mounted and including means for lifting said rear wall above water level.

10. Apparatus as claimed in claim 1 in which said non-return valve is movably mounted and including means for lifting said valve above water level.

11. Apparatus as claimed in claim 1 including a pair of hulls connected in space parallel relation to form a catamaran type vessel in which the facing side walls of the hulls constitute the side walls of the collecting tank, and a bulkhead constituting the rear wall of the collecting tank, said bulkhead extending between the hulls at the rear end thereof.

12. Apparatus as claimed in claim 11 in which said bulkhead is mounted at its upper edge for rearward pivotal movement about an horizontal axis extending above water level, and including an hydraulic actuator for moving said bulkhead between a vertical closed position and an open position in which said bulkhead extends rearwardly above water level.

13. Apparatus as claimed in claim 11 including a cage detachably mounted on support means and positioned between said hulls forwardly of said bulkhead, said cage comprising a framework covered with wire mesh defining side walls, a rear wall and a floor, and hydraulic actuators operative on said support means to lift said cage to a position in which the floor is above water level.

14. Apparatus as claimed in claim 11 in which the impeller is carried on a shaft which is supported at its ends on the ends of links which extend forwardly to a cross beam connecting said hulls and to which the other end of said links are pivotally connected, the said shaft being also supported at its centre on one end of a bell crank lever which is pivotally connected at its centre with said cross beam and connected at its other end with an hydraulic actuator whereby said impeller may be lifted above water level.

15. Apparatus as claimed in claim 14 in which said links and said bell crank lever are fast with a cross shaft which is rotatably mounted in bearing brackets mounted on said cross beam.

16. Apparatus as claimed in claim 14 including an hydraulic motor for rotating said impeller, said motor being mounted on said bell crank lever and connected with said impeller by a chain drive.

17. Apparatus as claimed in claim 11 including a floor member extending between the facing sides of said hulls and below water level, said floor member having a rear edge positioned below the impeller and spaced therefrom and a front edge extending forwardly of the impeller.

18. Apparatus as claimed in claim 16 in which said floor member is curved forwardly and upwardly from said rear edge and at said front edge is formed with a short lip portion which is curved forwardly and downwardly.

19. Apparatus as claimed in claim 17 comprising a first cross shaft mounted for rotation in bearing brackets carried on a cross beam connecting said hulls, arms fast with said cross shaft and extending rearwardly therefrom, a shaft carrying said impeller rotatably mounted in the ends of said arms, a further arm fast with said cross shaft and connected with a first hydraulic actuator, links supporting the rear edge of the said floor member from said impeller shaft, a second cross shaft mounted for rotation in bearing brackets carried on said cross beam, arms fast with said second cross shaft and pivotally connected at their ends with the front edge of said floor member, and a further arm fast with said second cross shaft and connected with a second hydraulic actuator, operation of the first and second actuators being effective to raise said impeller and said floor member above water level.

20. Apparatus as claimed in claim 11 in which the non-return valve is supported on the forward ends of two L-shaped arms which extend downwardly and forwardly adjacent the respective facing sides of the two hulls from a rotatably mounted cross shaft to which the L shaped arms are secured, an arm fast with said cross shaft and an hydraulic actuator connected with said arm for moving said L shaped arms forwardly and upwardly to bring said non-return valve above water level.

21. Apparatus as claimed in claim 20 in which the plate constituting said non-return valve is pivotally mounted on a shaft extending between the forward ends of said L shaped arms.

22. Apparatus as claimed in claim 20 in which the lower edges of the forwardly extending portions of the two L shaped arms are curved forwardly and upwardly and are joined by a plate of similar curvature.

23. Apparatus as claimed in claim 20 including flexible means connecting the side edges of the non-return valve plate with the respective forwardly extending portion of said L shaped arms whereby to prevent said plate moving to a vertical position or forwardly of such position.

* * * * *